Aug. 7, 1962  E. ANTOSZEWSKI ET AL  3,048,746
ELECTRICAL PROTECTIVE RELAYS USING DOUBLE
RECTIFIED BRIDGE COMPARATORS
Filed March 2, 1959 a = GERMANIUM TYPE
b = SELENIUM TYPE

Inventors:
Eugeniusz Antoszewski
Eric Paddison
By: Stevens, Davis, Miller and Mosher
Attorneys United States Patent Office 3,048,746
Patented Aug. 7, 1962

3,048,746
ELECTRICAL PROTECTIVE RELAYS USING DOUBLE RECTIFIED BRIDGE COMPARATORS
Eugeniusz Antoszewski and Eric Paddison, Stafford, England, assignors to The English Electric Company Limited, London, England, a British company
Filed Mar. 2, 1959, Ser. No. 796,695
Claims priority, application Great Britain Mar. 4, 1958
14 Claims. (Cl. 317—32)

This invention relates to electrical protective relays using rectifier bridge comparators.

According to the invention, in an electrical protective relay using a double rectifier bridge comparator comprising two full-wave rectifier bridges having differentially opposed parallel-connected outputs, the bridges have asymmetrical characteristics in that not all of the half-wave rectifier elements forming the bridges are of the same type, whereby a modified relay characteristic arises from the bridge asymmetry.

According to a feature of the invention, the rectifier bridge producing an output tending to operate the relay comprises rectifiers having a generally lower forward resistance characteristic relative to those of the rectifiers forming the rectifier bridge producing an output tending to restrain the relay from operation.

According to one feature of the invention, said asymmetry arises owing to the use of selenium or silicon rectifiers to form one of said bridges, and germanium or copper oxide rectifiers to form the other of said bridges.

According to a further feature of the invention, the combined output from the bridges is applied to a polarized tripping relay device and one of said bridges has a tripping-relay-operating output and comprises germanium or copper oxide rectifiers, whereas the other bridge which has a tripping-relay-restraining output comprises selenium or silicon rectifiers.

According to another feature of the invention, said asymmetry arises owing to the difference in the number of plates or cells forming the rectifiers of one bridge compared with those forming the rectifiers of the other bridge.

According to a further feature of the invention, the combined output from the bridges is applied to a polarized tripping relay device, and one of the birdges has a tripping-relay-operating output and comprises rectifiers with a smaller number of plates or cells and of a type having a generally lower forward resistance characteristic than the rectifiers of the other bridge which provides a tripping-relay-restraining output.

Figure 1:
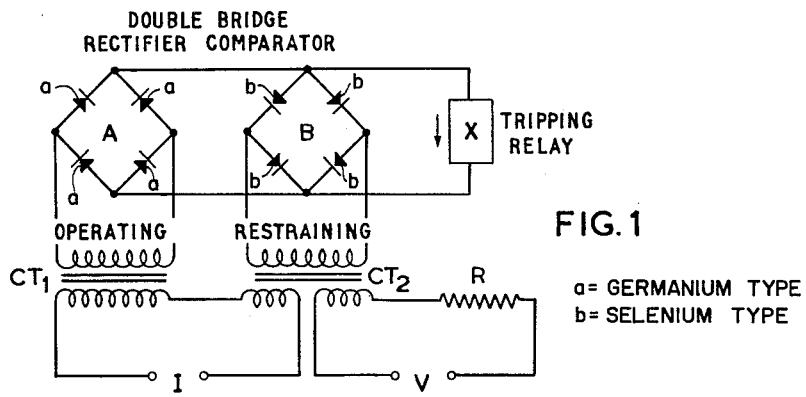
Figure 2:
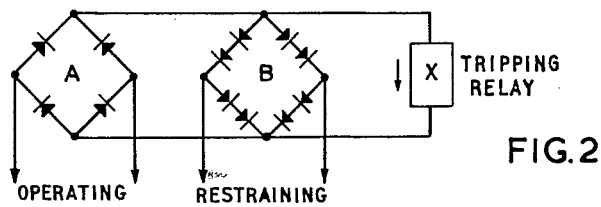
Figure 3:
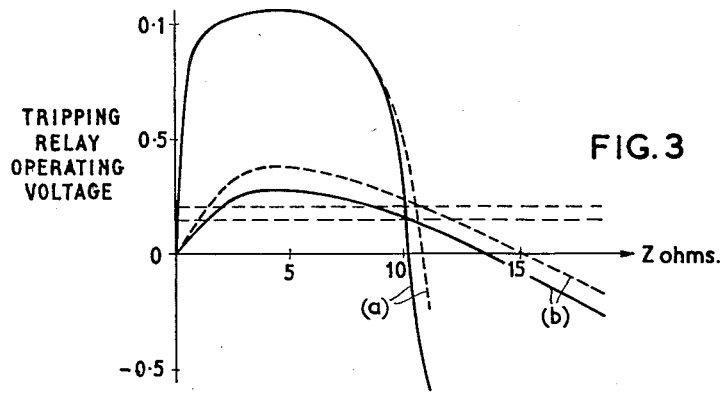
Figure 4:
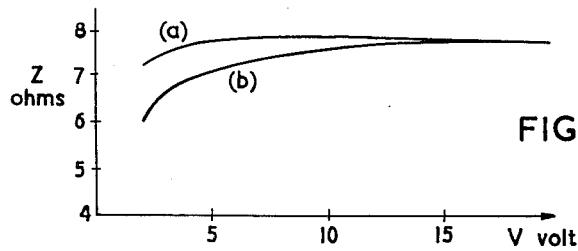

The invention will now be described with reference to the accompanying drawing, in which:

FIG. 1 shows an impedance type electrical protective relay including a double bridge rectifier comparator, FIG. 2 illustrates a part of the relay shown in FIG. 1, and shows how the rectifiers forming the bridges of the comparator may have different numbers of cells for a purpose to be described, and FIGS. 3 and 4 show operating characteristics of a distance relay of the kind shown in FIG. 1 and having an asymmetrical bridge arrangement owing to the use of selenium rectifiers in one bridge, and germanium rectifiers in the other bridge.

FIG. 1 shows a relay incorporating a double bridge comparator. The relay is of a kind having a mho characteristic and responds to two alternating input signals denoted I and V respectively to produce an output which is applied to operate a polarized tripping relay when the ratio of the amplitidues of $I$ and $I-V/R$ exceeds a predetermined level. The relay is shown in a very schematic form.

The relay includes current transformers $CT_1$ and $CT_2$ whose function is to generate current signals of the form $I$ and $I-V/R$. It is presumed that the signal I is a current signal and, in a protective relay system, this signal would be derived from a current transformer energized directly by the current in a protected line. The current signal I is applied to the primary of the current transformer $CT_1$ and also to one of the two primary windings of the current transformer $CT_2$. The voltage signal V, which may be derived from a voltage transformer connected to be energized by the protected line, is converted to a current signal V/R and applied to energize the other primary winding of current transformer $CT_2$, the connections being such that under normal working conditions of the protected line the magnetic action of the current in this second primary winding opposes that in the other primary winding of the current transformer. For this purpose the resistor R is connected in series with this second primary winding.

The outputs from the secondary windings of current transformers $CT_1$ and $CT_2$ are current signals respectively proportional to $I$ and $I-V/R$. These signals are applied to different full-wave bridge rectifiers denoted A and B respectively. The rectifier elements of bridge A are of the germanium type and those of bridge B of the selenium type. The outputs from these bridges are parallel-connected in differential opposition and supply a polarized tripping relay denoted X. The relay X is polarized in the sense that it operates when it carries current in the direction indicated by the arrow. Thus, for the connections of the half-wave rectifiers forming the bridges A and B as shown, the tripping relay will operate when the voltage output from the secondary winding of current transformer $CT_1$ exceeds that from the secondary winding of current transformer $CT_2$. This means that in operation the relay will operate to perform a tripping function when the ratio of the amplitudes of $I:I-V/R$ exceeds a predetermined level.

When the relay is operating in a condition in which the signal I, though large, is not sufficiently strong to promote relay operation but is not far removed from this condition, then current will be circulated between the two bridges A and B. This renders the performance of the relay somewhat dependent upon the resistance characteristics of the rectifiers forming the bridges and it is the object of this invention to modify the bridges with a view to improving the relay performance. It has been found that by making the bridges different by using rectifiers in one bridge of a different type to those used in the other bridge, then certain advantages arise in the relay application described in FIG. 1. This will be more clearly understood by reference to the operating characteristic shown in FIG. 3. The curves in this figure show the output voltage signal from the double bridge comparator appearing across the tripping relay of FIG. 2 for conditions in which the current signal I is maintained constant and the voltage signal V increased from zero. An in-phase relationship between I and V is presupposed. Also, the phase shift characteristics of the current transformers are taken to be the same. The parameter V of FIG. 3 is shown in the form $V/I=Z$, Z having the dimensions of the resistance in the case under consideration.

Four curves are shown in FIG. 3. The two full line curves correspond to the use of identical selenium rectifiers in all arms of the two bridges A and B of FIG. 1. Full curve (a) applies where the constant current I has a high value (5 amps in a particular test case) and curve (b) applies where the constant current I has a low value (0.33 amp). It is desirable in a relay of the kind shown in FIG. 1 for the operating characteristic to be a flat impedance/voltage characteristic over as wide a current range as possible. It becomes, therefore, desirable to design the polarized tripping relay X to operate at the level of energization corresponding to the intersection between the two full curves (a) and (b) shown in FIG. 3. In other words, the requisite sensitivity of the polarized tripping relay X is fixed for optimum performance by the characteristics of the double bridge comparator.

The discovery upon which this invention is founded is that if the bridges A and B are asymmetrical in the sense that one uses a different type of rectifier than the other then, provided rectifiers of the appropriate type are used in the appropriate bridge A or B, the sensitivity demanded of the polarized tripping relay X for optimum relay performance can be reduced. The bridge A, which is the one producing the operating output signal, should comprise rectifiers having a low forward resistance characteristic, whereas the bridge B, which is the one producing the restraining output signal can with advantage comprise rectifiers having a relatively high forward resistance. Thus, the broken curves (a) and (b) shown in FIG. 3 correspond to the full curves (a) and (b) but apply to a relay in which the bridge A comprises germanium rectifiers and the bridge B comprises selenium rectifiers. It will be seen from the operating characteristics shown in FIG. 3 that the intersection between the two broken curves occurs at a level of energization of the tripping relay X which is some 50% greater than that occurring for the all-selenium double bridge rectifier comparator. It, therefore, becomes possible by using the selenium-germanium combination of rectifiers in the manner just indicated to improve the relay design by replacing the polarized tripping relay by one which is less sensitive and therefore more robust and more reliable than has hitherto been possible. Alternatively, for example, the germanium rectifiers may be replaced by copper oxide rectifiers. Silicon rectifiers are an alternative to selenium rectifiers.

Owing to the non-linear shape of the rectifier forward resistance characteristics the double bridge rectifier circuit has an inherent tendency to be self-limiting in respect of the output voltage signal supplied to the tripping relay X. This is evident from FIG. 3 by the manner in which curves (a) approach one another at high output signals. At low currents the rectifier shunting effect which gives rise to the self-limiting feature is undesirable and it is, therefore, preferable in a double bridge rectifier comparator system as used in FIG. 1 for the forward resistance of the bridge B to be high. On the other hand, it is also preferable for the forward resistance of the rectifier bridge A to be low so as to keep the burden on the current transformer $CT_1$ low and, consequently, the magnetising current of this transformer low.

This is an inherent feature of a double bridge rectifier comparator in which the bridge A comprises germanium rectifiers and the bridge B comprises selenium rectifiers. The net result is that for a given sensitivity of the polarized relay, less current (I) may be required for a given voltage (V) than is required in a relay in which both bridges comprise the same type of rectifier. At high current the operating impedance (Z) is almost the same for both arrangements.

This latter feature will be more clearly understood by reference to FIG. 4 which shows the operating impedance of the relay as a function of the voltage signal V. Curve (a) applies for a relay in which bridge A comprises germanium rectifiers and bridge B comprises selenium rectifiers, and curve (b) applies for an arrangement in which the rectifiers of both bridges A and B are of selenium. It is seen from FIG. 4 that by using a combination of different types of rectifiers in the different bridges of the comparator and maintaining the sensitivity of the polarized relay constant, the characteristic of the relay can be improved in that it is flat over a wider range of voltage variation.

Whereas it has been proposed to use selenium or silicon rectifiers in one bridge of a double bridge rectifier comparator and germanium or copper oxide rectifiers in the other bridge of the comparator, similar effects can to some extent be obtained by using rectifiers having the same working materials but having different numbers of plates or cells. It is however preferred to combine this latter feature with the different rectifier-type configuration. Thus, in FIG. 2 it is shown how an effect a little better than that already described can be obtained by incorporating a greater number of selenium cells in bridge B than germanium cells in bridge A.

What we claim as our invention, and desire to secure by Letters Patent, is:

1. An electrical protective relay comprising a double bridge rectifier comparator including a first full-wave rectifier bridge including arms containing half-wave rectifier elements, a second full-wave rectifier bridge including arms containing half-wave rectifier elements connected to said first bridge so that the output from the comparator is the difference of the outputs from the bridges, a polarized auxiliary tripping relay connected to respond to a condition wherein the output from said first bridge exceeds the output from said second bridge, means for supplying said first bridge with an operating input dependent on a variable electrical quantity of a circuit to be protected by said relay and means for supplying said second bridge with an electrical reference quantity, the arms of said first bridge having a forward resistance which is lower than the forward resistance of the arms of said second bridge.

2. An electrical protective relay according to claim 1, wherein the half-wave rectifier elements of said first bridge are of a material having inherently a lower forward resistance than the forward resistance of the half-wave rectifier elements of said second bridge.

3. An electrical protective relay according to claim 1, wherein the arms of said second bridge contain a larger number of half-wave rectifier elements in series than the arms of said first bridge.

4. An electrical protective relay according to claim 2, wherein the half-wave rectifier elements of said first bridge are germanium rectifiers and those of said second bridge are selenium rectifiers.

5. An electrical protective relay according to claim 2, wherein the half-wave rectifier elements of said first bridge are copper oxide rectifiers and those of said second bridge are selenium rectifiers.

6. An electrical protective relay according to claim 2, wherein the half-wave rectifier elements of said first bridge are germanium rectifiers and those of said second bridge are silicon rectifiers.

7. An electrical protective relay according to claim 2, wherein the half-wave rectifier elements of said first bridge are copper oxide rectifiers and those of said second bridge are silicon rectifiers.

8. An electrical protective relay according to claim 3, wherein said half-wave rectifier elements are germanium rectifiers.

9. An electrical protective relay according to claim 3, wherein said half-wave rectifier elements are copper oxide rectifiers.

10. An electrical protective relay according to claim 3, wherein the half-wave rectifier elements of said first bridge are of a material having inherently a lower forward resistance than the forward resistance of the half-wave rectifier elements of said second bridge.

11. An electrical protective relay according to claim 10, wherein the half-wave rectifier elements of said first bridge are germanium rectifiers and those of said second bridge are selenium rectifiers.

12. An electrical protective relay according to claim 10, wherein the half-wave rectifier elements of said first bridge are copper oxide rectifiers and those of said second bridge are selenium rectifiers.

13. An electrical protective relay according to claim 10, wherein the half-wave rectifier elements of said first bridge are germanium rectifiers and those of said second bridge are silicon rectifiers.

14. An electrical protective relay according to claim 10, wherein the half-wave rectifier elements of said first bridge are copper oxide rectifiers and those of said second bridge are silicon rectifiers.

References Cited in the file of this patent

UNITED STATES PATENTS

| | | |
|---|---|---|
| 2,343,423 | Reagan | Mar. 7, 1944 |
| 2,601,473 | Van Weynsbergen | June 24, 1952 |
| 2,775,725 | Ellis | Dec. 25, 1956 |
| 2,777,107 | Medlar | Jan. 8, 1957 |
| 2,845,581 | Hodges et al. | July 29, 1958 |
| 2,920,242 | Koss | Jan. 5, 1960 |
| 3,001,101 | Paddison | Sept. 19, 1961 |

FOREIGN PATENTS

| | | |
|---|---|---|
| 299,502 | Switzerland | Aug. 16, 1954 |